(12) United States Patent
Chang et al.

(10) Patent No.: US 9,262,923 B2
(45) Date of Patent: Feb. 16, 2016

(54) BLIND SPOT DETECTION SYSTEM

(75) Inventors: Tsai-Wang Chang, Hsinchu (TW);
Min-Jung Wu, Hsinchu (TW);
Chien-Chung Tseng, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 209 days.

(21) Appl. No.: 13/313,029

(22) Filed: Dec. 7, 2011

(65) Prior Publication Data

US 2013/0044006 A1 Feb. 21, 2013

(30) Foreign Application Priority Data

Aug. 19, 2011 (TW) .............................. 100129828 A

(51) Int. Cl.
*G08G 1/09* (2006.01)
*G08G 1/16* (2006.01)
*G01S 13/86* (2006.01)
*G01S 13/93* (2006.01)
*B60Q 9/00* (2006.01)

(52) U.S. Cl.
CPC ................ *G08G 1/167* (2013.01); *B60Q 9/008* (2013.01); *G01S 13/86* (2013.01); *G01S 13/931* (2013.01); *G01S 2013/9332* (2013.01); *G01S 2013/9353* (2013.01); *G01S 2013/9389* (2013.01)

(58) Field of Classification Search
CPC .......... G08G 1/16; G08G 1/167; G01S 13/00; G01S 13/93; G01S 13/931; G01S 2013/9332; G01S 2013/9353
USPC .............. 340/901–905, 933–943, 425.5, 435, 340/438, 447; 180/271–290; 280/735; 342/70, 159–164; 348/148; 701/45, 701/300–301
See application file for complete search history.

(56) References Cited

U.S. PATENT DOCUMENTS

| 5,418,359 | A | 5/1995 | Juds | |
|---|---|---|---|---|
| 5,828,333 | A * | 10/1998 | Richardson et al. | 342/70 |
| 7,061,373 | B2 * | 6/2006 | Takahashi | 340/435 |
| 7,432,800 | B2 * | 10/2008 | Harter et al. | 340/436 |
| 7,511,607 | B2 * | 3/2009 | Hubbard et al. | 340/435 |
| 7,517,099 | B2 * | 4/2009 | Hannah | 359/841 |
| 7,652,560 | B2 * | 1/2010 | Ohmura | G01S 7/412 340/435 |
| 7,741,961 | B1 * | 6/2010 | Rafii et al. | 340/435 |
| 7,859,432 | B2 * | 12/2010 | Kim et al. | 340/937 |
| 8,044,780 | B2 * | 10/2011 | Tseng et al. | 340/435 |
| 8,190,355 | B2 * | 5/2012 | Emam et al. | 701/300 |
| 8,310,353 | B2 * | 11/2012 | Hinninger et al. | 340/435 |
| 2002/0167398 | A1 * | 11/2002 | Strasser | 340/425.5 |

(Continued)

FOREIGN PATENT DOCUMENTS

| CN | 1468761 A | 1/2004 |
|---|---|---|
| TW | 200914305 | 4/2009 |

*Primary Examiner* — Steven Lim
*Assistant Examiner* — Ryan Sherwin
(74) *Attorney, Agent, or Firm* — Winston Hsu; Scott Margo

(57) ABSTRACT

A blind spot detection system for a vehicle includes a vehicle information detecting module for obtaining at least one vehicle information of the vehicle corresponding to an external environment, an alarm for generating an alarm signal, a plurality of sensors each for emitting a radio signal and receiving a reflecting signal of the transmitted radio signal to detect whether an object exists within a specific range and generate a detection result accordingly, and a control module for controlling the alarm to generate the alarm signal according to the at least one vehicle information and a plurality of detection results generated by the plurality of sensors.

4 Claims, 2 Drawing Sheets

(56) References Cited

U.S. PATENT DOCUMENTS

| | | | |
|---|---|---|---|
| 2003/0016636 A1* | 1/2003 | Tari et al. | 370/328 |
| 2005/0047158 A1* | 3/2005 | Koehler | 362/487 |
| 2007/0126563 A1* | 6/2007 | Sjonell | 340/435 |
| 2008/0266170 A1* | 10/2008 | Klotzbuecher et al. | 342/113 |
| 2009/0063053 A1* | 3/2009 | Basson et al. | 702/1 |
| 2009/0140881 A1* | 6/2009 | Sakai et al. | 340/901 |

* cited by examiner

BLIND SPOT DETECTION SYSTEM

BACKGROUND OF THE INVENTION

1. Field of the Invention

The present invention relates to a blind spot detection system, and more specifically, to a blind spot detection system capable of effectively simplifying a structure, reducing costs, and enhancing sensing accuracy.

2. Description of the Prior Art

According to the statistics, most of traffic accidents are related to drivers' distraction. If a driver is alerted at 0.5 seconds before being likely to have a collision, it can avoid at least 60% of rear-end collisions, 30% of head-on collisions and 50% of road ramp related traffic accidents. If alerted before one second, it can avoid 90% of traffic accidents. The statistics shows traffic accidents can be effectively reduced if the drives have enough reaction time. Therefore, a blind spot detection (BSD) system, which is a smart vehicle equipment, is developed for such needs.

The BSD system is a safety protection technique for vehicles, and utilizes a radar sensing technique of millimeter wave to achieve early warning. More specifically, the BSD system uses an image self-recognition method of machine vision, to detect obstacles in blind spot areas on left/right/front sides of a vehicle. If the BSD system detects that a specific obstacle exists in a blind spot area, the BSD system actively sends out a message of light or sound, for example, to a driver, so that the driver can determine a driving direction accordingly, to avoid a traffic accident due to the driver's careless or blind side of vision.

Generally speaking, the BSD system deploys sensors in rear and/or front bumpers of a vehicle, emits millimeter wave radio signals, and receives corresponding reflecting signals, to determine whether there is an obstacle, such as another vehicle or a person, within a specific range. Additionally, in order to improve determination accuracy to avoid erroneous determination or alarming, the BSD system requires vehicle related information such as velocity and angle deviation of the vehicle, to determine whether to start BSD or perform debugging; however, the vehicle related information is acquired from an electric control unit of the vehicle through a transmission line or wire. Under such a condition, connection of wires in the vehicle become more complex, especially for a modern smart vehicle, which is equipped with more and more functions and accessories (e.g., collision-warning detection radar, lane departure warning radar, reversing radar, anti-lock brake system, electric stable control system, etc.). Meanwhile, data robust is required during transmission, to avoid interferences from vehicle electric elements or environment noise. For example, ignition system, battery, wipers, electric windows, electric seats, air conditioner, radio, fuel supply system, clutch system, etc. can generate noise; or high-voltage, temperature/humidity changes of external environment may affect stability or accuracy of data transmission.

Moreover, data output from a vehicle electric control unit may not match a data specification of the BSD system, and it needs to transform the transmission data again, therefore delaying the data operation needed for real-time synchronization and causing time delays.

In conclusion, a known BSD system needs to obtain the vehicle related information such as the velocity and the angle deviation from the electric control unit inside the vehicle, and it increases the difficulty of deploying and also decreases the convenience. Therefore, an improvement for the prior art is necessary.

SUMMARY OF THE INVENTION

It is therefore a primary objective of the claimed invention to provide a blind spot detection system.

The present invention discloses a blind spot detection system for a vehicle, which comprises a vehicle information detecting module, for obtaining at least one vehicle information of the vehicle corresponding to an external environment, and an alarm, for generating an alarm signal, and a plurality of sensors, each for emitting a radio signal and receiving a reflecting signal of the transmitted radio signal, to detect whether an object exists within a specific range and generate a detection result accordingly, and a control module, for controlling the alarm to generate the alarm signal according to the at least one vehicle information and a plurality of detection results generated by the plurality of sensors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
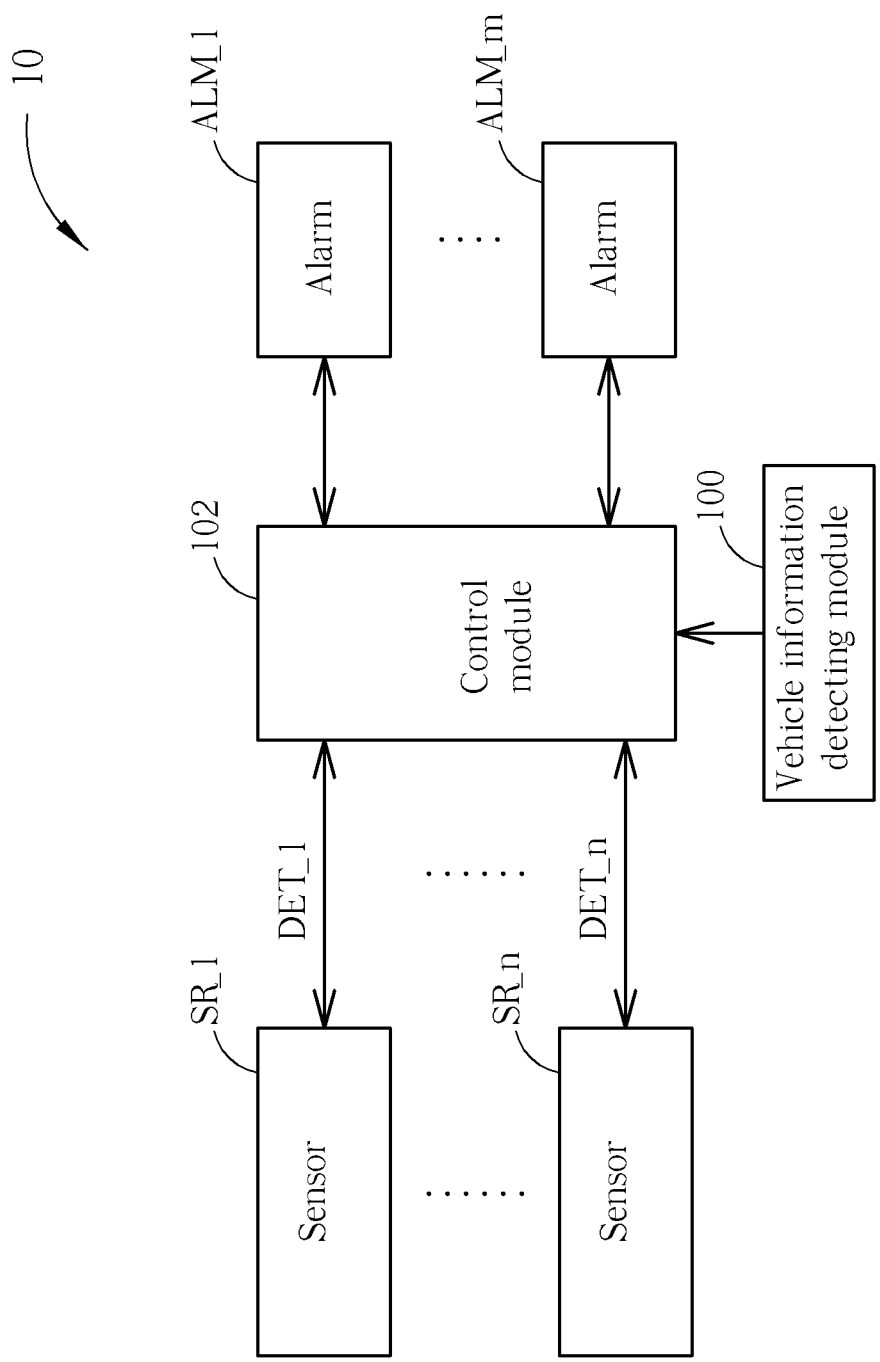
FIG. 1 is a schematic diagram of a blind spot detection system according to an embodiment of the present invention.

Please refer to FIG. 1, which is a schematic diagram of a blind spot detection (BSD) system 10 according to an embodiment of the present invention. A BSD system 10 is deployed in a vehicle such as a car, a bus or a truck, used for detecting whether there is an obstacle, such as another vehicle or a person, within a specific blind spot area, and emitting an alarm signal accordingly to avoid a traffic accident due to driver's careless or blind side of vision. The BSD system 10 includes a vehicle information detecting module 100, alarms ALM_1-ALM_m, sensors SR_1-SR_n and a control module 102. The vehicle information detecting module 100 is used for obtaining vehicle information of the vehicle corresponding to an external environment, such as a velocity, an acceleration value, and degree of inclination (corresponding to a plumb line), to avoid erroneous determination or alarm of the control module 102. The sensors SR_1-SR_n are equipped in rear and/or front bumpers of the vehicle, each for detecting whether an object exists in a blind spot area of the driver via the radar sensor technique. That is, the sensors SR_1-SR_n emit radio signals and receive the corresponding reflecting signals, to detect whether objects exist within the specific range, and generate detection results DET_1-DET_n. The control module 102 controls operations of the alarms ALM_1-ALM_m according to the vehicle information output from the vehicle information detecting module 100 and the detection results DET_1-DET_n sent back from the sensors SR_1-SR_n. The alarms ALM_1-ALM_m can be light emitting diodes, horns, etc., for generating alarm signals of light or sounds, so as to remind the driver whether a vehicle or a passenger approaches. The number m of the alarms ALM_1-ALM_m is not ruled, as long as greater than 1.

Briefly, in the BSD system 10, the vehicle information required by the control module 102 for performing BSD is provided by the build-in vehicle information detecting module 100. In other words, the control module 102 does not acquire the vehicle information such as velocity and angle deviation from an electric control unit inside the vehicle, thereby decreasing the deployment of wires inside the vehicle, and avoiding the vehicle information being interfered during transmission.

Please note that, the BSD system 10 shown in FIG. 1 is an embodiment of the present invention, and those skilled in the art can make modifications accordingly, which is not limited thereto. The vehicle information detecting module 100 is used for obtaining the vehicle information corresponding to the external environment, and composition or realization thereof should be properly adjusted according to different requirements. For example, if the vehicle information required by the BSD system 10 includes velocity, acceleration value and angle deviation, the vehicle information detecting module 100 can include but not limited to a GPS receiver, an accelerometer and a gyroscope.

The vehicle information obtained by the vehicle information detecting module 100 is primarily used to avoid the control module 102 wrongly determining obstacle statuses of the blind spot areas. In an embodiment, the control module 102 determines operations of the sensors SR_1-SR_n according to the vehicle information; for example, when the velocity does not reach a predefined value, the control module 102 stops the operations of the sensors SR_1-SR_n. In another embodiment, the sensors SR_1-SR_n can determine whether to operate according to the vehicle information; therefore, the control module 102 directly transfers the vehicle information output from the vehicle information detecting module 100 to the sensors SR_1-SR_n.

Figure 2:
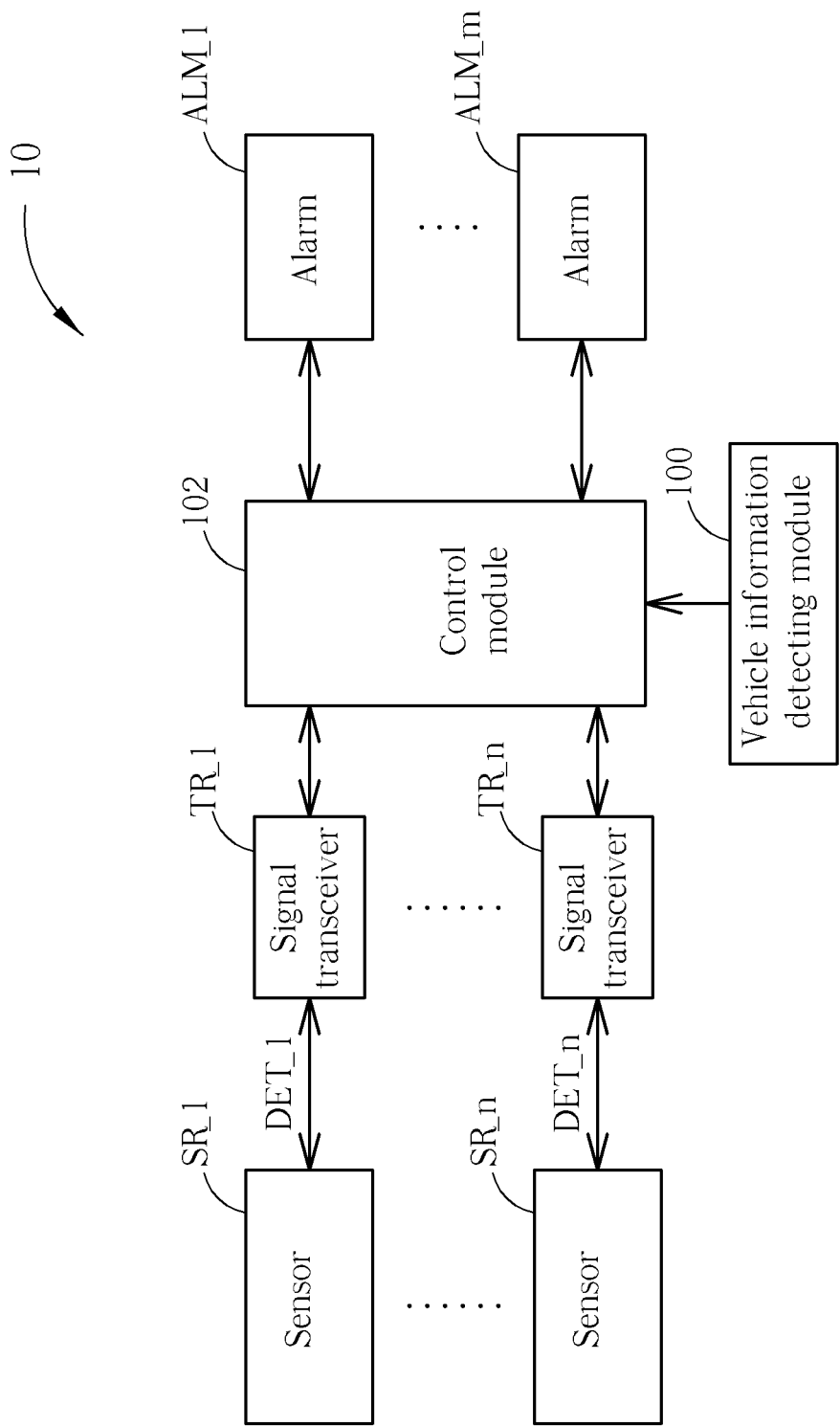
FIG. 2 is a schematic diagram of the blind spot detection system shown in FIG. 1 adding signal transceivers.

On the other hand, to ensure that signals between the control module 102 and the sensors SR_1-SR_n are correctly transmitted, signal transceivers TR_1-TR_n are added between the control module 102 and the sensors SR_1-SR_n as shown in FIG. 2, for converting or amplifying data between the sensors SR_1-SR_n and the control module 102.

Furthermore, the above illustration focuses on components of the BSD system related to the invention idea, and other elements/components, such as power system and memories, not highly related, are not further narrated. For example, the control module 102 can include a central processor and a storage device, which is well known for those skilled in the art.

As mentioned in the above, the prior art BSD system obtains vehicle related information such as velocity and angle deviation from the electric control unit inside the vehicle, which increases the difficulty of deployment and decreases the convenience. In comparison, in the BSD system 10 of the present invention, the vehicle information required by the control module 102 for performing BSD is provided by the build-in vehicle information detecting module 100, so as to decrease wires inside the vehicle, simplify overall structure, reduce costs, avoid the vehicle information being interfered during transmission, and enhance sensing accuracy.

In conclusion, the BSD system of the present invention effectively simplifies the structure, reduces costs, and enhances sensing accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A blind spot detection system for a vehicle, comprising:
a vehicle information detecting module, independent from an electronic controller inside the vehicle, for obtaining at least one vehicle information of the vehicle corresponding to an external environment, wherein the at least one vehicle information comprises at least one of an acceleration value and degree of inclination corresponding to a plumb line;
an alarm, for generating an alarm signal;
a plurality of sensors, each for emitting a radio signal and receiving a reflecting signal of the transmitted radio signal, to detect whether an object exists within a specific range and generate a detection result accordingly;
a control module, comprising:
 a central processor, coupled to the vehicle information detecting module, the alarm, and the plurality of sensors; and
 a storage device, storing a program code for instructing the central processor to control the alarm to generate the alarm signal according to the at least one vehicle information and a plurality of detection results generated by the plurality of sensors and to send the at least one vehicle information to the plurality of sensors; and
a plurality of signal transceivers between the plurality of sensors and the control module, for amplifying or converting data between the plurality of sensors and the control module;
wherein the vehicle information detecting module is built in the blind spot detection system for secluding interference;
wherein the control module further sends the at least one vehicle information to the plurality of sensors according to the program code, and each of the plurality of sensors determines whether to operate according to the at least one vehicle information.

2. The blind spot detection system of claim 1, wherein the vehicle information detecting module further comprises a Global Positioning System receiver for calculating a velocity of the vehicle such that the at least one vehicle information further comprises the velocity.

3. The blind spot detection system of claim 1, wherein the vehicle information detecting module comprises an accelerometer for calculating an acceleration value of the vehicle as the at least one vehicle information.

4. The blind spot detection system of claim 1, wherein the vehicle information detecting module comprises a gyroscope for calculating an angle of the vehicle corresponding to a plumb line as the at least one vehicle information.

* * * * *